UNITED STATES PATENT OFFICE.

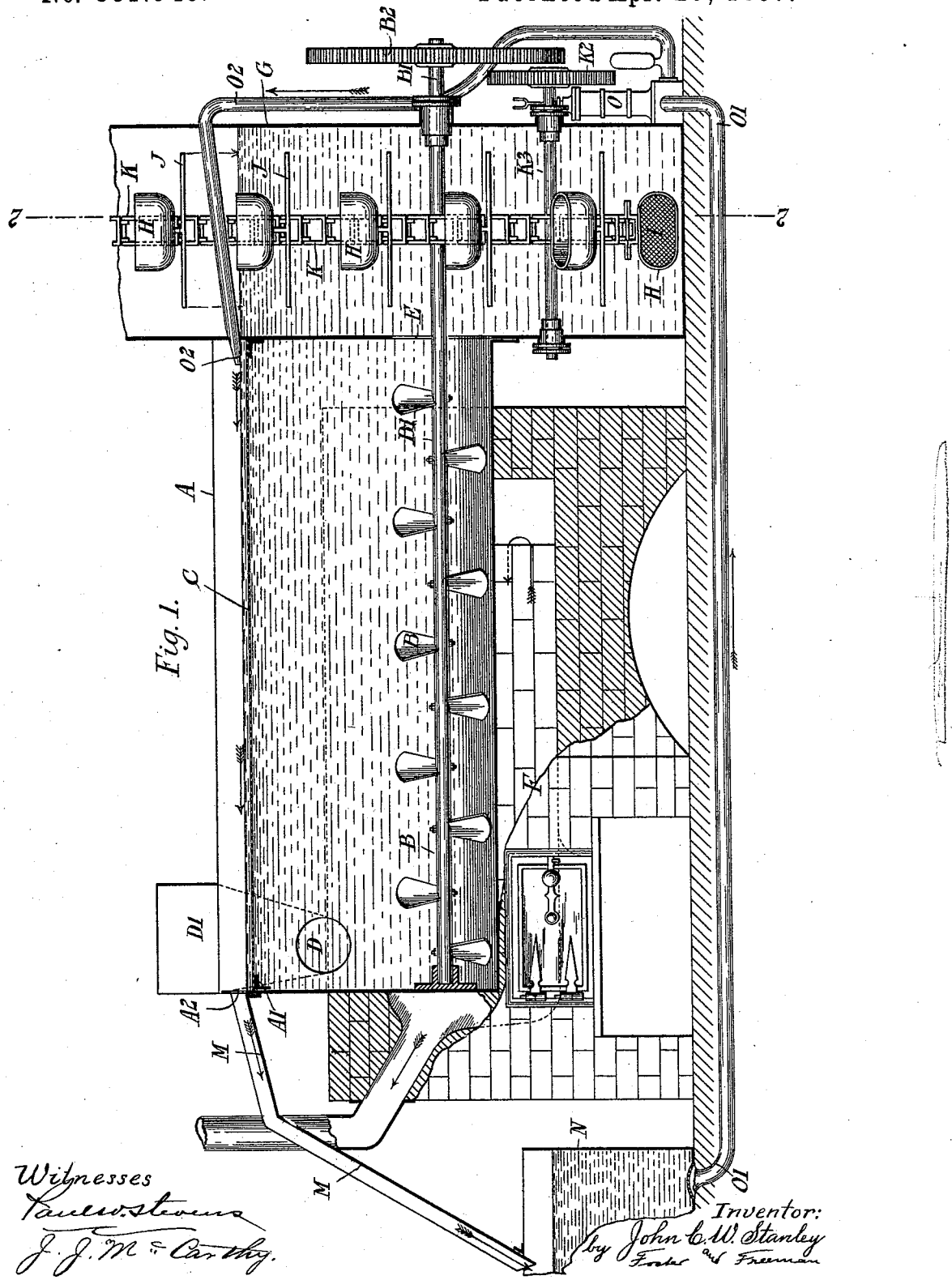

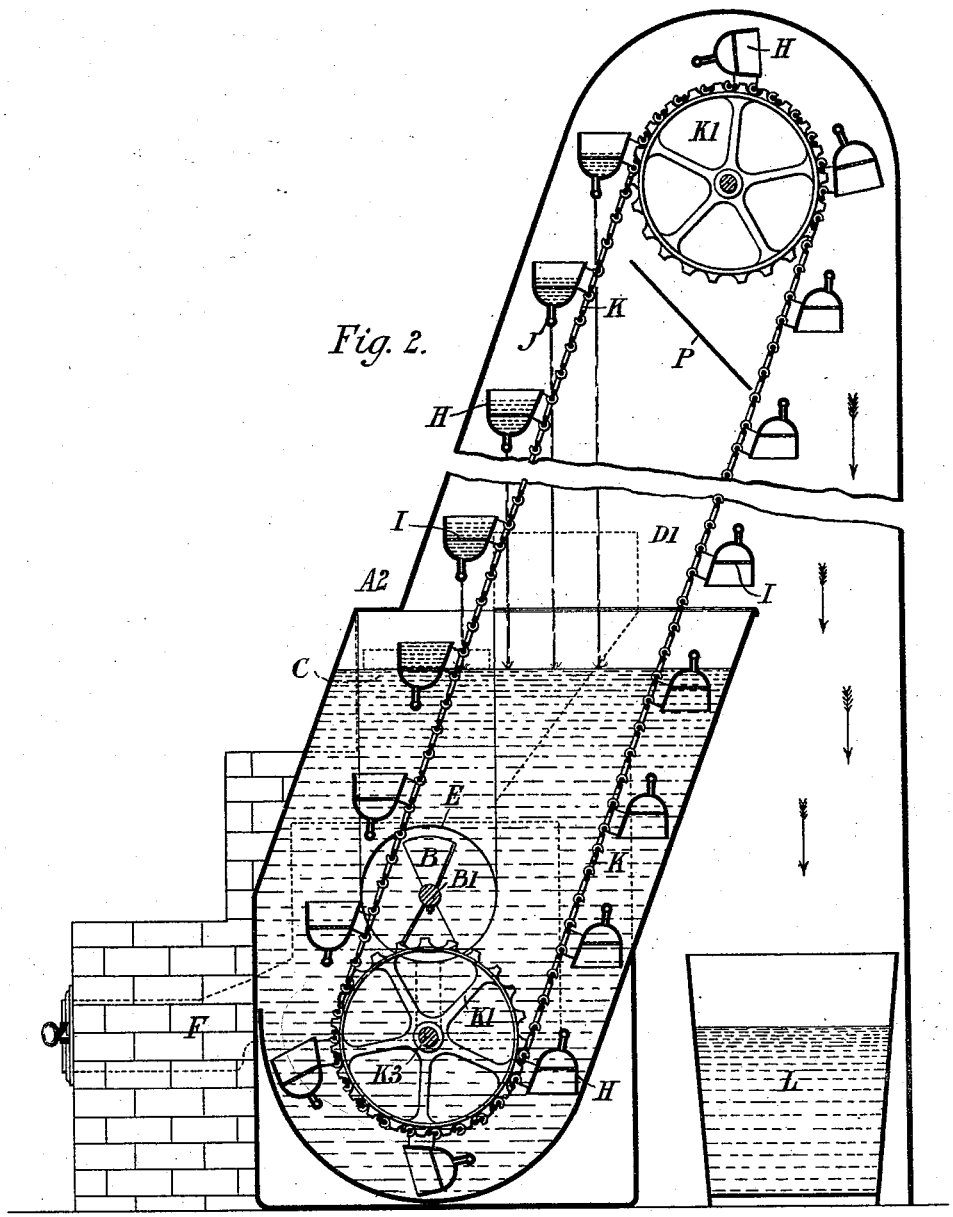

JOHN CHARLES WILLIAM STANLEY, OF LONDON, ENGLAND, ASSIGNOR TO THE FISH UTILIZATION SYNDICATE, LIMITED, OF SAME PLACE.

APPARATUS FOR TREATING FISH AND FISH-OFFAL.

SPECIFICATION forming part of Letters Patent No. 581,045, dated April 20, 1897.

Application filed July 18, 1896. Serial No. 599,701. (No model.)

*To all whom it may concern:*

Be it known that I, JOHN CHARLES WILLIAM STANLEY, a subject of the Queen of England, residing at London, England, have invented certain new and useful Improvements in or Relating to the Treatment of Fish and other Offal or Similar Refuse, of which the following is a specification.

This invention relates to the treatment of fish, fish-offal, or other animal matter or similar refuse for the purpose of removing the oil and preparing the rest of the material for manure or for other purposes. Fish-guano, for instance, may be one of the products obtained by the practice of this invention, as hereinafter explained.

To avoid needless repetition or complications, this invention is herein described as employed for the treatment of fish, though it is to be understood that any other animal matter or similar refuse may be similarly treated.

The fish is treated by cooking it in boiling water and providing at the same time means for carrying off the oil as it is liberated and for removing the rest of the fish, that is to say, the fibrous, bony, and other parts not escaping with the oil, so that the process may be a continuous one, the apparatus shown in the accompanying drawings being suitable for carrying the invention into practice.

Prior to cooking fish-offal the blood and liquid portions may be drained from it and extraneous matters removed by hand.

In the drawings, Figure 1 is a sectional view showing the preferred form of apparatus constructed according to this invention, and Fig. 2 is a vertical section taken on the line 2 2 of Fig. 1.

Like letters indicate like parts throughout the drawings.

A cooking tank or vessel A, of any suitable shape and dimensions, but conveniently a fairly long one in relation to its width and of moderately shallow depth, is provided, the lower part being preferably semicylindrical, as shown in Fig. 2. In the lower portion of the vessel A is a worm conveyer B, while near the top but below the water-level is provided a perforated plate, grating, or the like barrier C, which may be supported on angle-iron bearers A', secured to the walls of the vessel A or in other convenient manner. The perforations or interstices of C are of such size that only the water and not the floating fish or other solid matter can pass through them.

Near one end of the vessel A and below the grating C an opening D is provided for the introduction of the material to be treated, and around this inlet is fitted a hopper D', in which the water rises to the same level as that within the vessel A. At the opposite end of the vessel A is formed the outlet-opening E, through which the worm conveyer B delivers the material under treatment, this conveyer preferably having broken or independent blades, so that at the same time as the material is moved toward the outlet E it is churned or reduced to a finely-divided state, so as to enable it to freely liberate the oil contained therein. If desired, I may employ a worm conveyer or other device in connection with the hopper D for forcing the fish into the tank.

The heating of the cooking vessel A may be effected by means of a furnace F in the brickwork in which said vessel is set or built in any desired manner, so that the fire may play directly upon it, or it may be effected in various other ways, as, for example, by steam or hot air passed through coils or jackets in or around the vessel or delivered right into the liquid contents thereof.

The material discharged by the worm conveyer B through the outlet E of the vessel A falls conveniently into the lower part of the elevator-casing G, which part virtually constitutes an extension of the cooking vessel A, and the water therein maintains the same level as that within A.

Portions of the upper part of the casing G may be removable to allow of inspection of the operation of the elevator. The buckets H of the elevator are constructed in a special manner, so as to allow of drainage without the drainage from one bucket falling onto the buckets beneath it. This, as shown in the drawings, may be accomplished by providing the buckets (which are constructed of metal or other suitable material) each with a false perforated bottom I, Fig. 2, of, for example, wire-gauze, and with one or more openings communicating with a cross-pipe or equivalent J, which, as shown in Fig. 1, delivers the drainage from each bucket H at the sides of the elevator or beyond the ends of the buckets, so as not to interfere with the bucket beneath it. Instead of the pipes J being of ⊥ shape, as shown in Fig. 1, to deliver the liquid to both sides of the elevator they may be L-shaped to deliver the liquid to one side only, or instead of the liquid being delivered through the pipes, such as J, it may be delivered directly through perforations formed in one or both of the ends of each bucket and with or without plates or channels, so as to clear the other buckets beneath it.

The buckets H are secured to one or more chains K, working over wheels K', either of which may be positively rotated by a suitable motor. In the drawings it is the lower of the two wheels K' which is the one connected with the motor, a spur-wheel $K^2$ being shown as fitted on the shaft $K^3$ for this purpose.

The shaft B' of the worm conveyer B conveniently extends through the elevator, as shown in Fig. 1, and at its end is provided with a spur-wheel $B^2$ or equivalent, whereby rotation may be imparted to it, or other means may be employed for this purpose.

The material raised by the buckets H is drained in its ascent in the elevator, (which may be extended to any desired height to properly effect the necessary drainage,) the liquid flowing out through the pipes or equivalent J and the solid matter being tipped out of the buckets, as they arrive at the top of the elevator, into a receptacle L, which may from time to time be removed in order that its contents may be delivered to apparatus for further treatment.

The oil rises to the surface of the water in the cooking vessel A and escapes over the end thereof or by a suitable weir $A^2$ into a pipe or channel M, which conducts it into a settling-tank or receiving vessel N, wherein the oil floats on the water. The water is constantly pumped or removed from the lower part of the tank N, as by a pump O, (shown diagrammatically in Fig. 1,) through a pipe O' and redelivered, as by a pipe $O^2$, onto or near the surface of the water in the vessel A at or near the end of the latter opposite that at which the weir $A^2$ is located, this arrangement being provided to cause the oil to flow toward the weir. The same water is thus used over and over again, but is preferably changed at the end of each day's operations. It may be run into precipitating and settling tanks and treated with a precipitating agent—alum or lime, for instance—or other agent.

P is a plate which directs any material which falls on it toward the receptacle L instead of allowing it to return to the lower part of the elevator-casing.

The oil may be removed from off the water contained in the vessel N by pumping, skimming, or otherwise, after which it may be purified or treated in any suitable manner, preferably by straining or filtering or washing. If desired, it may be treated with fullers' earth, with which it can be mixed, the oil being subsequently expressed by filter-presses or other suitable means.

I claim—

1. The combination of a cooking vessel having a supply-opening at or near one end and an outlet-opening at the other, a grating or screen located in said vessel at a point above said openings, a conveyer in the vessel delivering the material through the outlet-opening, a casing communicating with the vessel, an elevator in the casing, and means for producing a continuous circulation of water in the said vessel and casing, substantially as described.

2. The combination of a cooking vessel having a supply-opening at or near one end and an outlet-opening at the other, a grating or screen located in said vessel at a point above said openings, a conveyer in the vessel delivering the material through the outlet-opening and constructed with broken or disconnected blades, a casing communicating with the tank through the outlet-opening, a series of elevator-buckets working in said casing, and means for producing a continuous circulation of water through the said vessel and casing, substantially as described.

3. The combination of a cooking vessel having a supply-opening at or near one end and an outlet-opening at the other, a grating or screen located at a point within the upper edge of the vessel and above said openings, a weir or overflow-gate at one end of said grating or screen, and a hopper leading into said inlet-opening, a pipe or conduit leading from the weir and a tank into which the pipe empties, a casing communicating with the vessel through the outlet-opening, elevator-buckets in the casing, and means for producing a continuous circulation of water through the vessel, casing, and tank, substantially as shown and described.

4. In the treatment of fish and other animal matter or similar refuse apparatus comprising a cooking vessel, means for heating the same, a conveyer B, and grating C, the vessel A being provided with openings D and E below the grating for the admission and exit of the solid particles of the material under treatment, and with an opening or weir $A^2$ above the grating for the outflow of the oil substantially as described.

5. In an apparatus for the treatment of fish or other matters in solution, an elevator comprising a series of buckets, each provided with means for straining the liquid from the solid matter and discharging such liquid beyond the ends of the bucket, substantially as described.

6. In an apparatus for the treatment of fish or other matters in solution, an elevator, the buckets of which are each provided with a perforated false bottom, and means for discharging the liquid beyond one or both ends of said buckets, substantially as described and for the purpose set forth.

7. The combination of the vessel A, for receiving the liquid and solid matters, means for heating the same, means for feeding the solid matter along the lower part of the said vessel, a casing communicating with the vessel, an elevator having a series of straining-buckets, means for moving the same to a position to discharge the solid matter outside the liquid in the casing, a receptacle for the solid matter, a settling-tank N, to receive oil and water from the vessel A, and means to circulate the water through the said tank and vessel, substantially as described.

8. In an apparatus for the treatment of fish or other animal matter, the combination with a cooking vessel, of a casing divided into two compartments, one of said compartments communicating with said vessel, means to convey the solid matter from the cooking vessel to the communicating compartment, and an elevator having a series of straining-buckets to convey the solid matter from the compartment communicating with the vessel and discharge it into the other compartment of the casing, substantially as described.

In testimony whereof I have hereto set my hand in the presence of the two subscribing witnesses.

JOHN CHARLES WILLIAM STANLEY.

Witnesses:
ALFRED J. BOULT,
HARRY B. BRIDGER.